Patented Apr. 7, 1936

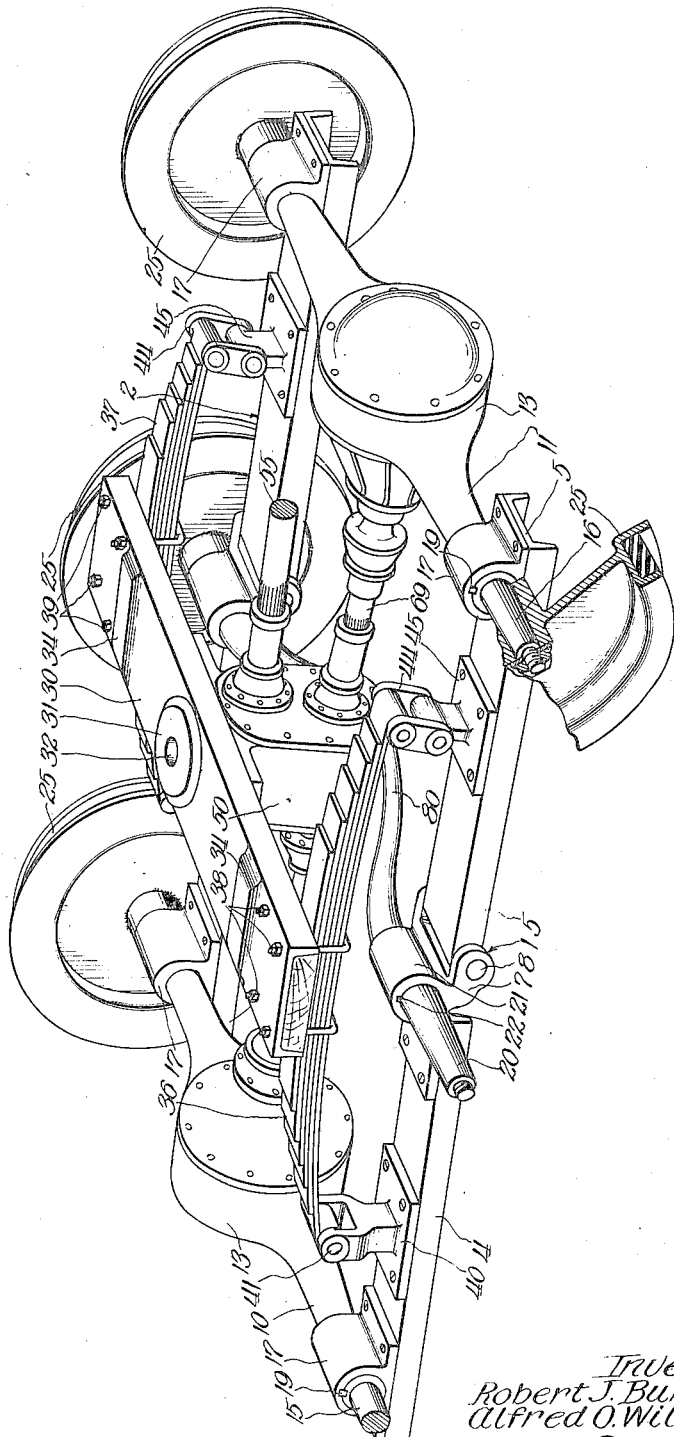

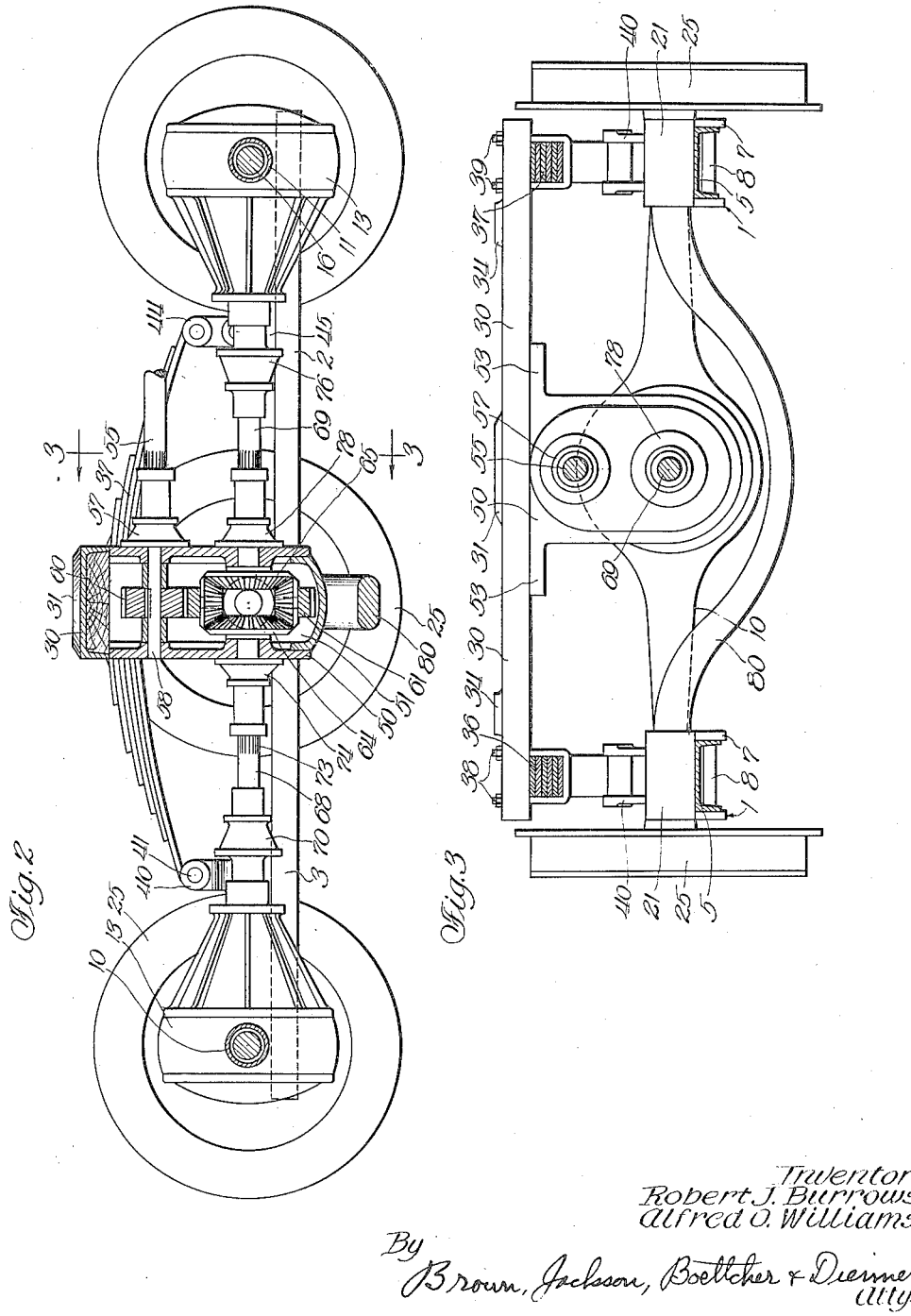

2,036,194

UNITED STATES PATENT OFFICE 2,036,194

TRUCK

Robert J. Burrows and Alfred O. Williams, Battle Creek, Mich., assignors to Clark Tructractor Company, Battle Creek, Mich., a corporation of Michigan Application April 6, 1932, Serial No. 603,462

26 Claims. (Cl. 105—118)

The present invention relates generally to light weight railway cars and has for its principal object the provision of a new and improved truck for such cars.

For some time considerable attention has been paid to the designing and developing of light weight railway equipment suitable for use on branch lines and other situations where the traffic is not so heavy as on the main lines. Light weight rolling stock is advantageous in many respects, particularly for branch line service, in that the expense of operation is relatively small and wear and tear on the road bed is reduced proportionately to the reduction in weight. In the ordinary type of rolling stock, however, a reduction of weight brings about a reduction in traction as well as in braking ability, but with the advent of the rubber tired wheel it becomes possible to utilize exceptionally light weight equipment with rubber tired wheels with no loss of either traction or braking ability. The design of such equipment, however, entails the use of multi-wheeled trucks or the equivalent in order that the loading on the rubber tired wheels and the braking stresses may be kept down to a desirable minimum.

With these factors in mind, we have developed a new and improved truck for rail cars, particularly those of light weight construction. One of the principal purposes of the present invention is the provision of such a truck in which the loading on each wheel is kept below a desirable amount. More specifically, it is the object of the present invention to provide a truck wherein six supporting wheels are provided and in which the loading is equally distributed between all of the supporting wheels. It is also the object of the present invention to provide a form of spring suspension for the body of the rail car and to provide a flexible truck construction in which as little unsprung weight is present as possible. It is also the object of the present invention to provide such suspension means that the number of parts may be materially reduced while still providing a strong and sturdy construction.

Further, the present invention contemplates transmitting the driving effort from the truck to the rail car body supported thereby through the spring means. Still another object of the present invention is to provide a truck construction wherein the reactions due to the driving torque are balanced one against the other, this being in particular connection with a construction employing a number of supporting wheels in which the equal loading on all of the wheels is not disturbed or interfered with by virtue of any reaction due to driving torque.

Still further, the present invention contemplates not only a construction in which the number of parts have been reduced and the weight materially lessened but also a type of construction which may be utilized in a driving truck, that is, a truck in which the wheels are driven by power to propel the car. In this connection, the present invention contemplates the provision of a driving truck particularly adapted for the use of rubber tires and which is so arranged that there is a proper differentiation of power between the several driving wheels so that there will be no tendency whatsoever for excessive wear on the tires to occur due to slippage and the like.

These and other objects of the present invention will be apparent from the following detailed description of the preferred structural embodiment, taken in conjunction with the accompanying drawings in which:

Figure 1 is a perspective view of our improved rail car truck, certain parts being broken away in order to better indicate the construction;

Figure 2 is a vertical longitudinal section taken substantially midway of the truck and showing in particular the central spring mounted differential arranged to transmit power equally to the two driving axles at each end of the truck; and Figure 3 is a transverse cross sectional view taken along the line 3—3 of Figure 2.

Referring now to the drawings, the reference numerals 1 and 2 indicate the side members or wheel pieces constituting the side frames of the truck to which the wheel axles are secured. Each side frame member or wheel piece is disposed generally longitudinally of the truck and consists of two pivotally connected sections 4 and 5 flexibly connected together by means of a yoke 7 secured to the section 4 and a pivot pin 8 mounted in the yoke and serving to pivotally connect the section 5 to the section 4.

At the ends of the side frames or wheel pieces 1 and 2 driving axles 10 and 11 are mounted. Each driving axle comprises an axle housing having an enlargement 13 in which conventional differential means is disposed. Each driving axle also includes a pair of axle shafts, indicated in Figure 1 by the reference numerals 15 and 16. These axle shafts are supported for rotation in the axle housings in the manner following automobile practice, and the inner ends of the axle shafts 15 and 16 are connected to the respective differential gear means mounted in the central enlarged portions of the axle housings. The axle housings 10 and 11 are supported in nonrotatable relation with respect to the frame sections 4 and 5. For this purpose each housing is secured to the associated frame sections by brackets 17. These brackets are secured to the side frames in any desired manner, as by bolts, rivets, welds, or the like, and each axle housing is keyed to its supporting brackets, as indicated by the reference numeral 19.

In the preferred construction wherein the side frames each consists of a pair of flexibly or pivotally connected sections, an intermediate axle 20 is provided. Preferably, this intermediate axle is a dead axle, that is, it is not a driving axle, and it is fixedly secured to the side frames, preferably adjacent the pivotal axis of the frame sections. For this purpose the construction illustrated in Figure 1 employs a sleeve or boss 21 formed to receive the intermediate axle 20 and a key 22 is provided to prevent the axle 20 from rotating in the sleeves 21. Wheels 25 are mounted on the axle 20 and the axle shafts 15 and 16. The wheels on the latter are fixed thereto in any desired manner as by a key or the like while the wheels on the intermediate axle 20 are carried upon suitable bearings (not shown).

The wheels 25 may be of any suitable form adapted for use on rails, but preferably we employ rubber tired wheels, either of the solid or pneumatic type. Since the present invention is not concerned with the details per se of the supporting wheels, we have illustrated in somewhat simplified form a type of wheel employing double flanges with a tire of rubber or similar material disposed therebetween. The inner one of the double flanges is preferably extended radially so as to hold the wheels in proper position on the rails.

In our simplified form of construction the side frames or wheel pieces 1 and 2 are formed preferably of channel sections since this form provides ample strength and sturdiness without excessive weight.

The truck bolster upon which the car body or at least a portion thereof is mounted is indicated by the reference numeral 30. This truck bolster extends substantially transversely of the truck and includes the usual central boss 31 suitably apertured, as at 32, to receive the kingpin connecting the car body to the truck. Preferably, the truck bolster 30 is also provided with side bearings 34 of any desired construction.

The truck bolster 30 is supported upon the side frames 1 and 2 by spring means arranged not only to apply equal loads to the six wheels of the truck but also to take the thrust or driving effort where the truck is used as a driving truck. The preferred form of spring means is illustrated in Figure 1 in which the reference numerals 36 and 37 indicate semi-elliptic springs having their intermediate portions secured to the ends of the truck bolster by U-bolts 38 and 39. The ends of the springs 36 and 37 are connected to the respective sections 4 and 5 forming the side frames 1 and 2. One end of each of the springs is connected to section 4 of the associated side frame by means of a pedestal bracket 40 rigidly secured, as by bolts, or the like, to the frame section. A shackle bolt 41 serves to pivotally connect this end of each of the springs to the associated bracket 40. The opposite ends of the springs are connected by means of shackles 44 to a bracket 45 similar in form to bracket 40 but somewhat shorter in order to accommodate the vertically disposed shackles 44.

The driving axles 10 and 11 are adapted to be driven by power, in which case the truck becomes a driving truck. For this purpose the truck bolster 30 is arranged to support a differential housing 50, see Figure 2, in which is disposed a more or less conventional type of differential gear means 51. The form illustrated is a bevel gear differential but obviously spur gear differential means or the equivalent may be employed if desired. The differential housing or casing 50 includes a pair of laterally directed brackets 53 by means of which the housing 50 may be firmly secured to the under side of the truck bolster 30.

Power is transmitted to the differential means 51 through a power shaft or propeller shaft 55. This shaft connects with any suitable source of power such as a gasoline engine, oil engine, electric motor, or the like, or any combination of them, as may be found desirable or convenient. The power or driving shaft 55 is connected through a universal joint 57 with a short shaft 58 journaled in the upper portion of the differential housing 50, as best shown in Figure 2. The shaft 58 carries a driving pinion 60 which meshes with the ring gear 61 of the differential gear means 51.

The differential gears 64 and 65 of the differential 51 are connected to drive the axle shafts 15 and 16 to propel the rail car. For this purpose drive shafts 68 and 69 are provided. The drive shaft 68 is connected at one end with a universal joint 70 from which, in turn, driving torque is transmitted to the differential means mounted in the axle housing 10 and serving to transmit differential power to the axle shafts 15. At the other end the drive shaft 68 is connected by means of a slip spline 73 to one part of a universal joint 74 suitably connected to the differential gear 64 of the driving differential 51. The other driving shaft 69 is arranged in a like manner, being connected through a universal joint 76 with the differential gear means disposed in the axle housing 11 and connected at its other end with a universal joint 78 which in turn is connected to the other differential gear 65 forming a part of the differential gear means 51.

As will be clear from Figure 2, the differential 51 and its associated housing 50 is disposed substantially centrally of the truck and midway between the driving axles 10 and 11. Likewise the intermediate or dead axle 20 is also positioned midway of the truck, and in order to provide for this construction the dead axle 20 is formed with a downwardly extended curved portion 80 passing underneath the differential housing 50 so as to clear the same sufficiently to permit the necessary spring action. It is important to note, also, that the differential 51 and the housing 50 constitute a part of the sprung weight of the truck.

When the drive shaft 55 is rotated by any suitable source of power the differential 51 serves to divide the power delivery equally between the driving axles 10 and 11. The power thus delivered by the drive shafts 68 and 69 to the driving axles is again divided by means of the differential gear means mounted in the axle housings between the wheels on opposite sides of the truck. This makes for a very flexible delivery of power and is such an arrangement that there is no forced slipping of the wheels when the car rounds a curve. The pivotal connection between the sections comprising the side frames also provides a flexible construction in which inequalities of the road bed surface are not transmitted to the car and each wheel supports its proportionate weight of the load.

The driving thrusts are transmitted from the side frames through the brackets 40 to the springs 36 and 37, and by them the driving effort is transmitted through the truck bolster 30 to the car. This particular arrangement has the advantage of effectively transmitting thrusts to the car without the use of additional parts, the vertically disposed shackles 44 providing for the necessary displacement of the ends of the springs during the flexing thereof.

The brackets 40 and 45 are so positioned as to apply approximately equal loads to the wheels 25. In such case, the brackets 40 and 45 would be disposed a distance from the dead axle 20 equal to approximately two-thirds of the total distance between the dead axle 20 and the driving axles 10 and 11. However, it may be desired to apply a somewhat greater loading to the driving wheels than to the wheels journaled upon the fixed axle 20. In that case the brackets 40 and 45 would be disposed nearer the driving axles 10 and 11. It will be noted that each axle can move up and down independent of the other axles in riding over irregularities on the rails. It will also be noted that the driving reaction is transmitted through the axle housings 10 and 11 to the associated frame sections 4 and 5, respectively. In one, the reaction will tend to swing the frame section downwardly while the reaction in the other axle housing will tend to swing the associated frame section upwardly. Since these sections are pivotally connected together at their inner ends and adjacent the dead axle 20, the torque reaction from one axle is in a direction opposite to that of the other axle so that the torque load is balanced at the central or intermediate axle, whereby the loading on each of the wheels remains constant regardless of driving strains. The same is also true of braking strains.

The brake construction is not shown but any suitable form of brakes may be provided, either associated with the driving means or with the wheels themselves, using brake drums on each wheel or on certain of the wheels.

The principles outlined above may be employed where the truck is not a driving truck but merely a trailing truck. In such case the construction will be similar excepting that only load carrying axles are used front and rear instead of driving axles as described above.

While we have described above the preferred structure, it will be understood that our invention is not to be limited to the specific means shown and described but that, in fact, widely different means may be employed in the practice of the broader aspects of our invention.

What we claim, therefore, and desire to secure by Letters Patent is:

1. A rail car truck comprising articulated side members, a plurality of axles carried thereby, a semi-elliptic spring mounted on each of said side members with the ends of the spring connected with different portions of said articulated side member, and a transverse bolster mounted upon the central portions of said springs.

2. A rail car truck comprising a pair of articulated side members, each member consisting of a pair of pivotally connected channels, a wheel axle carried by said side members adjacent the pivotal connections of said channels, wheel axles mounted on said side members at the outer ends thereof, a bolster, and spring suspension means therefor comprising semi-elliptic springs having their ends pivotally connected, respectively, with said channels between the intermediate and outer wheel axles.

3. A six-wheel truck for rail cars and the like comprising articulated frame members, each comprising two interconnected sections, a pair of outer wheel axles connected near the outer ends of said sections, an intermediate wheel axle disposed adjacent the pivotal connections between said sections, a semi-elliptic spring for each of said frame members having its ends connected, respectively, with said sections intermediately between said outer wheel axles and said intermediate axles, to divide the load imposed upon the several axles, and car body supporting means mounted on said springs.

4. A six-wheel truck for rail cars and the like comprising longitudinally disposed frame members, each member consisting of a pair of pivotally connected sections, means secured to one section of each of said longitudinal frame members and to which the other section of that frame member is pivoted, a wheel axle secured to the outer ends of each of said sections, an intermediate wheel axle disposed between said first mentioned axles and carried by said first mentioned means, a transversely disposed bolster to which a rail car may be secured, and spring means connecting said bolster with each section of both of said longitudinal frame members.

5. A six-wheel truck for rail cars and the like comprising longitudinally disposed frame members, each member consisting of a pair of pivotally connected sections, means secured to one section of each of said longitudinal frame members and to which the other section of that frame member is pivoted, a wheel axle secured to the outer ends of each of said sections, an intermediate wheel axle disposed between said first mentioned axles and carried by said first mentioned means, a transversely disposed bolster to which a rail car may be secured, and longitudinally disposed spring means connecting the bolster with said longitudinally extending frame members, said spring means being connected to each of said sections intermediately between said wheel axles.

6. A six-wheel truck for rail cars and the like comprising a pair of longitudinally disposed frame members, wheel axles mounted on said frame members, one being intermediate the ends thereof and one being mounted at each end, a transversely disposed bolster to which a rail car may be connected, spring means supporting the bolster on said longitudinally disposed frame members, and means connecting said spring means with said longitudinally disposed frame members, said connecting means being positioned on said frame members between the axles according to the desired loading on the wheels.

7. A truck for rail cars and the like comprising a pair of side frames consisting of interconnected wheel pieces adapted for relative pivotal motion, wheel axles mounted thereon adjacent the ends of said pieces, an intermediate axle mounted on said side frames adjacent the axis of pivotal connection between said wheel pieces, a transversely disposed truck bolster, and spring means supporting said bolster on said wheel pieces.

8. A truck for rail cars and the like comprising a pair of side frames, each frame consisting of two interconnected sections pivotally connected together adjacent their inner ends, wheel axles mounted near the outer ends of said sections, an intermediate wheel axle mounted adjacent the pivotal connections of said sections, a truck bolster disposed above said intermediate axle, longitudinally disposed semi-elliptic springs secured to the ends of the truck bolster, and means connecting the ends of said springs to said frame sections.

9. A truck for rail cars and the like comprising articulated side members, driving axles on the side members, a transversely disposed truck bolster, spring means connected between the bolster and the articulated side members, and driving means for said axles comprising a drive shaft, a differential supported by said spring means, and means connecting the differential with said driving axles.

10. A truck for rail cars and the like comprising, in combination, longitudinally disposed side frames, driving axles carried at the ends of said frames, a dead axle positioned intermediate said driving axles, a transversely disposed truck bolster disposed above said dead axle, spring means connecting the ends of said truck bolster with said side frames, a differential housing carried by said bolster, a drive shaft journaled therein, and means connecting said driving axles with said differential.

11. A driving truck for rail cars and the like comprising, in combination, a pair of side frames, each consisting of two pivotally connected sections, a pair of driving axles mounted on said sections, each of said driving axles comprising a housing secured to said side frames in non-rotatable relation, a differential in each of said housings, and wheel axles connected with said differentials and journaled in said housings, a dead axle carried by said side frames and disposed intermediate said driving axles, a truck bolster, semi-elliptic springs having their intermediate portions connected to said truck bolster and their ends connected, respectively, with said frame sections, a differential housing carried on said truck bolster, a differential disposed therein, driving shafts connecting said last named differential with the differentials carried by said axle housings, and means for driving the differential carried by said differential housing.

12. A driving truck for rail cars and the like comprising, in combination, side frames, driving axles at the ends of said side frames, each of said driving axles comprising an axle housing fixedly secured to said side frames, a differential disposed in each of said axle housings, axle shafts connected with said differentials and journaled for rotation in said axle housings, driving shaft means for driving each of said differentials, a centrally disposed differential housing, spring means supporting said last named housing on said side frames, said driving shaft means being connected with said last named differential, and means for driving said last named differential.

13. A driving truck for rail cars and the like comprising, in combination, a pair of driving axles, a pair of longitudinally disposed articulated side members connected at their ends to said driving axles, each of said articulated side members consisting of two pivotally connected sections and each of said driving axles comprising an axle housing fixedly secured to the associated sections and axle shafts journaled for rotation in said housings, differential means disposed in each of said axle housings and operative to drive each of said axle shafts, a dead axle disposed intermediate said driving axles and mounted on said side members adjacent the pivotal connections of said sections, a truck bolster, a pair of semi-elliptic springs having their intermediate portions secured to the truck bolster, means pivotally connecting the ends of said springs to the sections of said side members, a differential housing carried by said truck bolster, a differential mounted therein and including a pair of differential gears, longitudinally disposed driving shafts having their inner ends connected with said differential gears, respectively, and their outer ends connected with the differential means in said axle housings for driving the same, and a driving shaft journaled for rotation in the upper part of said differential housing and geared to drive the differential therein.

14. A driving truck for rail cars and the like comprising longitudinally disposed articulated side frame members, a pair of driving axles, one disposed at each end of said side members, each of said driving axles comprising an axle housing secured to said side members in non-rotatable relation, driving shafts journaled in the housings and differential means disposed in each of said axle housings and operatively associated with the drive shafts to drive the same, the sections of said articulated side frame members being pivoted together for relative vertical movement, a dead axle mounted on said side members adjacent the pivot axis of the frame sections, a transverse truck bolster spring mounted on said side frame members, a differential housing carried by said bolster substantially in the vertical plane of said dead axle, the latter being formed with a downwardly disposed curved portion to clear the differential housing, differential means disposed in said differential housing, drive shafts and associated universal joints extending fore and aft from said differential housing and connected to drive the differential means, respectively, in said axle housings, a propeller shaft journaled in said differential housing, and gear means connecting said propeller shaft with the differential in said differential housing to drive the same and, in turn, drive said axle shafts.

15. A driving truck for rail cars and the like comprising a pair of side frame members each comprising two pivotally connected sections, a pair of driving axles positioned adjacent the outer ends of said sections, each of said driving axles comprising an axle housing keyed to the associated sections and axle shafts mounted for rotation in said axle housings, a dead axle disposed substantially midway between said driving axles and mounted adjacent the pivotal axis of said sections, wheels disposed on said dead axle and said axle shafts, and driving means for said axle shafts including differential gear means disposed in each of said axle housings, a drive shaft journaled at one end in each axle housing, said drive shafts extending in opposite directions and adapted to drive the associated differential gear means, the driving reaction being transmitted through the axle housings to said sections whereby the reaction of one driving axle balances the reaction of the other driving axle, and spring mounted differential means for driving said oppositely extending drive shafts.

16. A driving truck for rail cars and the like comprising a pair of side frame members each comprising two pivotally connected sections, a pair of driving axles positioned adjacent the outer ends of said sections, each of said driving axles comprising an axle housing keyed to the associated sections and axle shafts mounted for rotation in said axle housings, a dead axle disposed substantially midway between said driving axles and mounted adjacent the pivotal axis of said sections, wheels disposed on said dead axle and said axle shafts, and driving means for said axle shafts including differential gear means disposed in each of said axle housings, a drive shaft journaled at one end in each axle housing, said drive shafts extending in opposite directions and adapted to drive the associated differential gear means, the driving reaction being transmitted through the axle housings to said sections whereby the reaction of one driving axle balances the reaction of the other driving axle, a transverse bolster adapted to receive one end of a rail car, differential gear means carried by said bolster and operatively associated with said oppositely extending drive shafts to drive the latter, and spring means connecting said bolster with said side frame members and adapted to transmit driving effort from the driving truck to the rail car.

17. A driving truck for rail cars and the like comprising side frames consisting of flexibly connected sections, driving axles carried thereby, a bolster, a gear box carried by the bolster, flexible connections between said gear box and said driving axles, and spring means mounting said bolster on said side frames and adapted to transmit the driving thrust from said side frames to the bolster.

18. A driving truck for rail cars and the like comprising side frames consisting of flexibly connected sections, driving axles carried by said sections, a bolster, a gear box carried by the bolster, flexible driving connections between the gear box and the driving axles, and semi-elliptic springs mounting the bolster on said side frames, said springs being connected at their ends with the several sections whereby driving effort is transmitted through said springs.

19. A driving truck for rail cars and the like comprising a pair of interconnected transversely disposed axle housings held against relative displacement longitudinally of the truck, driving axles journaled in said housings, wheels mounted on said axles, means for driving said axles, rigid members non-rotatably connected with said housings and extending to a point adjacent the central portion of the truck, and means separate from said members but connected with the innermost ends thereof for holding said ends against movement in a generally vertical direction under the reactions imposed on said members, such separate means being pivotally connected with the ends of at least certain of said rigid members for movement relative thereto about a transverse axis.

20. A rail car truck comprising a pair of articulated side members, each member consisting of a pair of pivotally connected channels, a wheel axle carried by said side members adjacent the pivotal connections of said channels, wheel axles mounted on said side members at the outer ends thereof, wheels mounted on said axles, a bolster, and spring suspension means supporting the bolster on said channels at points thereon so that said wheels are subjected to substantially equal loads.

21. A driving truck for rail cars and the like comprising spring means, axles mounted for rotation adjacent the ends of said spring means, wheels mounted on said axles, means for rotating said axles for driving the car, a rigid member extending inwardly from each of said axles and associated therewith for resisting the driving reactions imposed thereon, said members having their innermost ends disposed adjacent one another and said axle rotating means being disposed generally centrally of the truck adjacent said innermost ends of the rigid members and including driving shafts extending outwardly in opposite directions toward said axles and positioned alongside said rigid members, respectively, and separate means pivotally interconnected with certain of said inwardly extending rigid members at their innermost ends and subjected to the reactions imposed on said members by said axles.

22. A truck for rail cars and the like comprising articulated side members, driving axles on the side members, a transversely disposed truck bolster, spring means connected between the bolster and the articulated side members, and driving means for said axles comprising a drive shaft, a differential supported by said truck, and means connecting the differential with said driving axles.

23. A driving truck for rail cars and the like comprising longitudinally disposed articulated side frame members, a pair of driving axles, one disposed at each end of said side members, each of said driving axles comprising an axle housing connected with said side members, driving shafts journaled in the housings, the sections of said articulated side frame members being pivoted together for relative vertical movement, a dead axle mounted on said side members adjacent the pivot axis of the frame sections, a transverse truck bolster spring-mounted on said side frame members, and driving connections for said axles including a differential housing disposed substantially in the horizontal plane of said side frame members, said dead axle being formed with a downwardly disposed curved portion to clear said driving connections.

24. A driving truck for rail cars and the like comprising, in combination, a pair of side frames, a pair of driving axles connected therewith, each of said driving axles comprising a housing connected with said side frames and axle shafts journaled in said housings, a truck bolster, spring means connected with said truck bolster and said side frames, a differential housing carried by said truck and disposed in the plane of said side frames, a differential mechanism disposed therein, driving shafts connecting said differential mechanism with said axle shafts, and means for driving the differential mechanism.

25. A driving truck for rail cars and the like comprising, in combination, a pair of side frames, a pair of driving axles mounted thereon, each of said driving axles comprising a housing connected with said side frames and axle shafts journaled in said housings, a truck bolster, semi-elliptic springs connected with the truck bolster and the side frames, a differential housing disposed in substantially the plane of said side frames, differential mechanism mounted in said housing, longitudinally extending driving shafts connecting said differential mechanism with said axle shafts, and means for driving said differential mechanism.

26. A driving truck for rail cars and the like comprising a pair of side frame members, a pair of driving axles positioned adjacent the outer ends of said sections, each of said driving axles comprising an axle housing connected with the side frame members in substantially non-rotatable relation and axle shafts mounted for rotation in said axle housings, wheels disposed on said axle shafts, and driving means for said axle shafts including differential gear means, a drive shaft journaled at one end in each axle housing, said drive shaft extending in opposite directions and adapted to drive the associated differential gear means, the driving reaction being transmitted through the axle housings to said side frame members whereby the reaction of one driving axle balances the reaction of the other driving axle, and means for driving said oppositely extending drive shafts.

ROBERT J. BURROWS.
ALFRED O. WILLIAMS.